Patented Oct. 16, 1923.

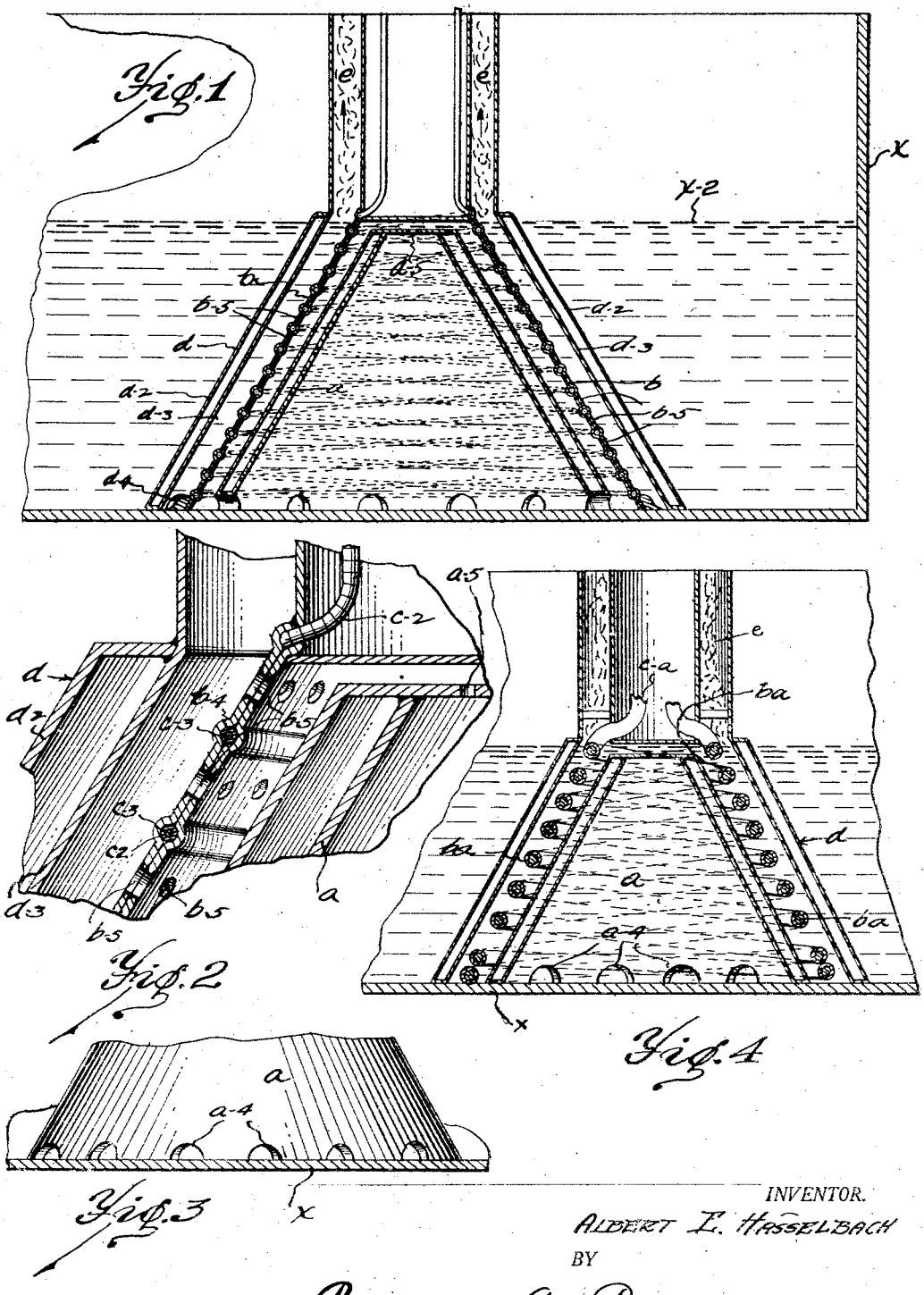

1,470,834

UNITED STATES PATENT OFFICE.

ALBERT E. HASSELBACH, OF DETROIT, MICHIGAN.

ELECTRIC HEATER.

Application filed December 30, 1920. Serial No. 434,002.

*To all whom it may concern:*

Be it known that I, ALBERT E. HASSELBACH, citizen of the United States, residing at Detroit, county of Wayne, State of Michigan, have invented a certain new and useful Improvement in Electric Heaters; and declare the following to be a full, clear, and exact description of the same, such as will enable others skilled in the art to which it pertains to make and use the same, reference being had to the accompanying drawings, which form a part of this specification.

My invention relates to electric heaters and has for its object the heating of water to produce steam almost instantly to be used in cooking or other similar purposes.

In the accompanying drawing:—

Figure 1 shows a section of an apparatus embodying my invention and a vessel of water in which it is placed in operative position.

Fig. 2 is a detailed section of a part of said apparatus.

Fig. 3 is an elevation of a part of the inner cone showing also in section, the bottom of the containing vessel.

Fig. 4 is a sectional view similar to Fig. 1 showing a modification.

$x$ is the containing vessel in which there is a quantity of water up to the level $x^2$.

$b$ is a heating cone consisting of two sheets of suitable metal formed into the shape of cones, one fitting closely over the other. Before these cones are placed together a helical groove, semi-circular in cross-section, is formed in the outer surface of the inner cone and a corresponding groove is formed in the inner surface of the outer cone. An electrical heating wire $c^3$ covered with porcelain beads $c^2$ is wound in the groove in the inner cone before placing the two cones together and this wire with the insulating beads is enclosed in the approximately circular aperture formed by the two registering semi-circular helical grooves as shown most distinctly in Fig. 2, and indicated by the reference character $b^4$. $b^5$ indicates apertures formed through the wall of the cone $b$. The two metal sheets of which said cone is composed are fastened together by welding the metal around the edges of said apertures.

$a$ is a double-walled cone enclosing a heat insulating space between its walls, formed at $a^4$ to permit the access of water to its interior and having an aperture $a^5$ at its top to permit the circulation of water. The cone $a$ is co-axial with the cone $b$ and its outer wall is spaced a short distance from the inner wall of the cone $b$.

$d$ is an outer cone co-axial with the cones $a$ and $b$ and having double walls $d^2$ $d^3$ enclosing a heat insulating chamber between them. $d^4$ indicates apertures to permit the access of water under the lower edge of the cone $d$.

In Fig. 4 I have substituted for the cone $b$ a coil $b^a$ containing heating conductors covered with material for excluding water and insulating said conductors. $c^a$ indicates the leading in strand. The spires of said coil are spaced from each other to permit free circulation of water.

$e$ is an annular space extending upward from the upper end of the conical space between the inner cone $a$ and the outer cone $d$.

The operation of the above described device is as follows:

The apparatus is placed in a vessel containing water as indicated in Fig. 1. The water extends into the space between the inner cone $a$ and the outer cone $d$ and comes in contact with the inner and outer surface of the cone $b$. The water also flows into the conical space inside of the cone $a$.

The electric current is then turned on which heats the walls of the cone $b$ and this heat is immediately imparted to the thin layer of water opposite the inner and outer surface of the cone $b$ and steam is thus produced passing up the conical passage $e$. This may be used for any purpose required. There is free circulation of water through the apertures $b^5$ and any steam formed within the wall of the cone $b$ may pass freely through said apertures.

The above described device may be easily and cheaply constructed, presents a large surface to the water to be heated and permits a free circulation of the water around its heating surface and limits the quantity of water being heated at one time. The porcelain beads may be strung upon the wire and the wire laid in the groove in the outer wall of the inner portion of the cone $b$ and the outer wall adjusted to place and fixed with very little trouble and a resulting construction is strong, permanent and effective.

Claims:

1. A heating element consisting of two walls of sheet metal conducting wires interposed between said walls, the metal of said walls being welded together between said wires.

2. A heating element consisting of two walls of sheet metal conducting wires interposed between said walls, the metal of said walls being welded together between said wires, said element being provided with perforations through its walls between said wires.

3. The combination of a vessel containing water, a heating element consisting of two concentric walls, each of which is continuous, so formed as to leave a laterally narrow space between said walls and a heating element in the space between said walls.

4. The process of making a heating element consisting in forming a groove in the outer surface of a piece of sheet metal, placing the heat producing conductor in said groove, placing a second sheet of metal with its surface against the surface of the first sheet so as to cover said grooves and enclose said conductor.

5. The process of producing a heating element consisting in forming a cone of sheet metal with a groove in its surface forming a second corresponding cone of sheet metal, placing a conductor in said groove and welding said cones together so as to enclose said conductor.

6. The process of making a heating element consisting in forming a groove in the surface of a piece of sheet metal, threading insulating beads upon a conducting wire, placing said wire with the beads thereon in said groove, placing a second sheet of material against the first sheet of material so as to enclose said conductor in said groove and securing said sheets together.

7. The combination of a conical wall, a second conical wall coaxial with the first conical wall, the two walls being so formed so as to leave a space between them, a conical heating element in the space between said wall, said element being provided with apertures extending transversely through its wall.

8. A heating element consisting of two sheets of suitable material, heating wires disposed between said sheets, said sheets being joined together intermediate of said wires, said element being provided with perforations through its wall between said wires.

In testimony whereof, I sign this specification.

ALBERT E. HASSELBACH.